July 13, 1971 P. M. DENK 3,592,668
PRESSURE INDUCED HEAT TRANSFER COOKING APPARATUS
Filed March 11, 1968 3 Sheets-Sheet 1
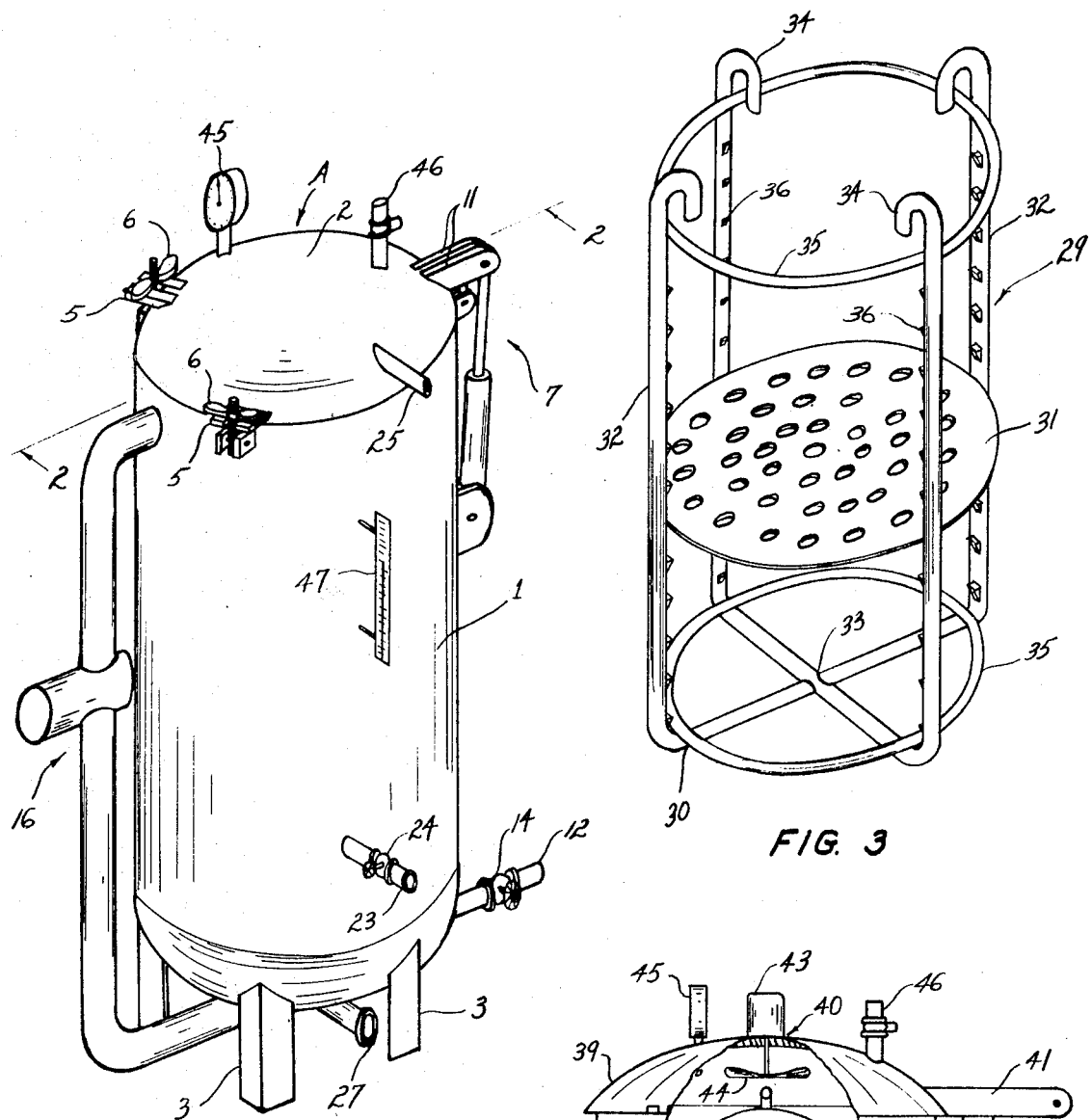
FIG. 1
FIG. 3
FIG. 6
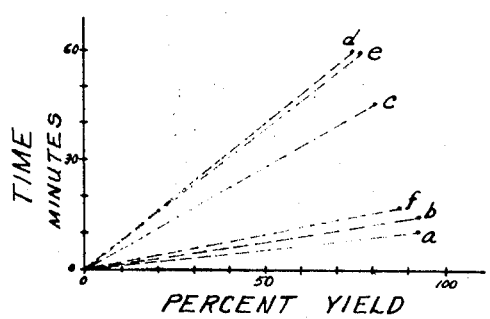
FIG. 7
INVENTOR:
PAUL M. DENK

INVENTOR:
PAUL M. DENK

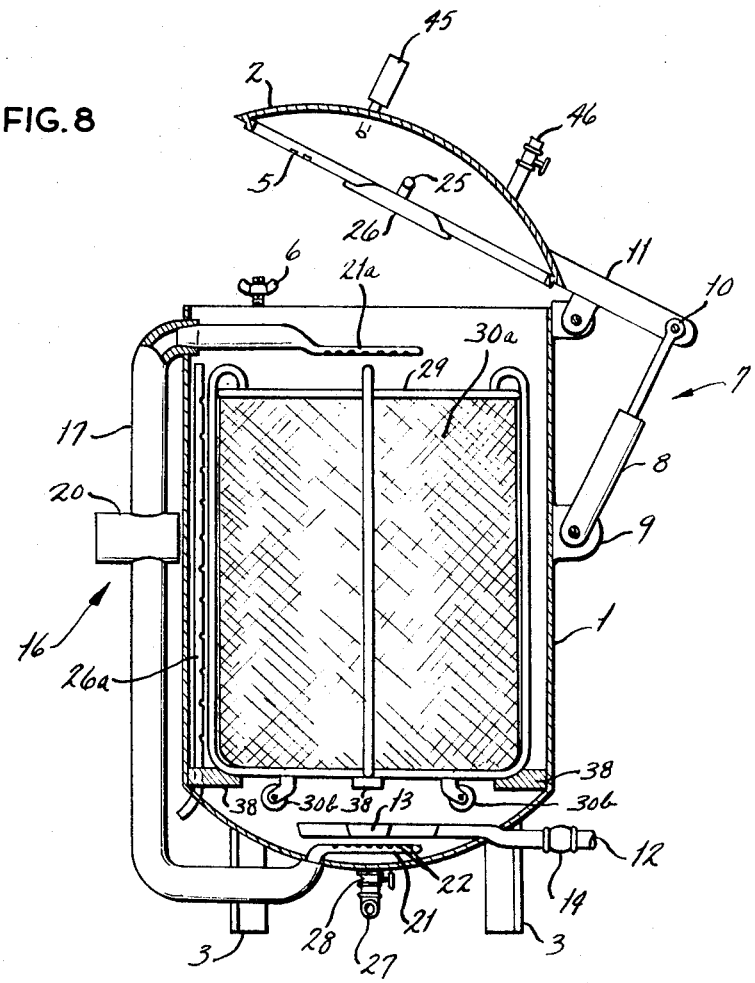

United States Patent Office 3,592,668
Patented July 13, 1971

3,592,668
PRESSURE INDUCED HEAT TRANSFER
COOKING APPARATUS
Paul M. Denk, University City, Mo., assignor to Food
Masters, Inc., University City, Mo.
Filed Mar. 11, 1968, Ser. No. 712,211
Int. Cl. A47j 36/00
U.S. Cl. 99—234                              10 Claims

ABSTRACT OF THE DISCLOSURE

In an apparatus for cooking foods, particularly meats, poultry, and fish, a pressure vessel is provided with attachments allowing for the selective conveyance of the elements of heat, pressure, and a coolant into the vessel, with a conduit also providing for the timely discharge of any of the foregoing. The apparatus incorporates means for inducing a circulation of the heat energy enclosed therein so that uniformity of temperature is maintained. Hydraulic or pneumatic lift means is provided for elevating or sealing the closure upon the vessel, and a removable retainer is supported within the interior of the apparatus to accommodate and support a quantity of food during the cooking process.

The process for cooking foods essentially comprises subjecting the enclosed foods to a quantity of thermal energy, introducing gaseous pressure to induce transfer of the heat into the interior of the foods thereby accelerating the cooking operation, while simultaneously circulating the heat energy, cooling the cooked foods and discharging the heat and pressure.

BACKGROUND OF THE INVENTION

This invention relates in general to the cooking of foods, and more particularly, pertains to an apparatus for cooking foods through their exposure to heat and then pressure.

Heretofore, numerous methods and devices have been improvised for effecting cooking of foods in the category of red meats, fish and poultry, by deposition of the product to be cooked directly into a cooking medium such as a heated oil, fat, or water, until the process is completed. More recently, means have been devised for accelerating the cooking operation by introducing pressure into the process so that, as for example, chicken parts, are being fried within a hot oil-filled cooker, pressure is introduced for the purpose of expediting the process while simultaneously enhancing the quality of the finished product. In addition, it has also become a standard operation, especially in the poultry industry, to cook the poultry parts either in a batch or continuous process of immersion within a container of fluid, such as boiling water, while simultaneously exerting pressure upon the product and its cooking medium. These processes provide satisfactory results from the viewpoint of preparing a thoroughly cooked and finished product within reduced time limits, but in the process of cooking in this manner the inherent flavor, natural juices, nutrient values, and even final texture content and product appearance, surface and internal, are sacrificed. For example, in cooking a poultry part under pressure in a heated oil or water bath, although the cooking process is quickened, it has been found that a substantial amount of the natural juices of the poultry exude out of the product thereby detracting from its taste, shelf life, and in addition, reducing its precooked weight by as much as twenty to thirty percent. These physical changes and statistical results are not satisfactory in meat processing operations where substantial quantities of the foods are prepared daily for the large institutional and consumer markets.

The common pressure cooking operation for cooking foods whereby heat and pressure gradually accumulate within a receptacle to prepare, for example meat, expends too much time in achieving a cooked finished product to be economically and feasibly utilized in a quantity meat processing operation. In addition, considerable shrinkage of product results. In performing tests where the meat is prepared by exposing it in a pressure vessel to a remote source of pressure followed by some degree of heat, results indicate that the time increment involved to get a finished product is greater than if the process is performed with heat being quickly exposed and immediately transferred into the product through the agency of a quantity of pressure.

Prior art pressure cooking and heating apparatuses indicate that little attention has been directed towards improving the operations of pressure vessels and retorts. The extent of developments in pressure cookers show that efforts have only been expended upon the basic embodiment of a pressure retaining vessel with means for randomly conveying heat and pressure to it.

It is, therefore, an object of this invention to provide an apparatus for rapidly preparing foods, such as meats and poultry, wherein quick exposure to a quantity of heat sufficient to cook the product is immediately subsequently followed by the introduction of pressure for compelling transfer of the heat into the interior of the product.

It is another object of this invention to provide a cooking apparatus wherein uniformity of temperature is sustained in the apparatus throughout the cooking operation.

It is a further object of this invention to provide a cooking apparatus which functions to provide a flavorous cooked product, one retaining its natural texture and moisture, while substantially reducing the weight loss from the precooked to the prepared product.

It is an additional object of this invention to provide an apparatus for preparing cooked meats, poultry and fish, which is expedited by a rapid cooling of the product upon attaining the required cooking temperature.

It is yet another object of this invention to provide a cooking apparatus which significantly reduces the time required for cooking foods.

It is still another object of this invention to provide a cooking apparatus which furnishes a final product fully cooked uniformly from its exposed surface to its inwardmost areas.

It is yet a further object of this invention to provide a cooking apparatus which completes the cooking of foods without any significant loss of their integral moisture or finished weight.

It is another object of this invention to provide an apparatus for pressure cooking foods including retainer means for conveniently exposing a large quantity of the product to stabilized temperatures and pressures, with the retainer being easily inserted or removed with respect to the apparatus through an automatically operative closure and lift device.

It is still a further object of this invention to provide a cooking apparatus which may be totally automated and regulated with little effort from a convenient panel board.

Other objects will become apparent to those skilled in the art in the light of the following description and accompanying drawings.

SUMMARY OF THE INVENTION

In accordance with this invention, generally stated, an apparatus is provided for cooking foods, including meat, poultry, and fish, which is compact in construction and simple of operation, performing through the co-ordination of the elements of heat and pressure, and their induced velocity, to achieve functioning. The apparatus employs a pressure vessel, capable of withstanding the normal pressures of cooking and those thereabove, such as customarily obtained during a pressure cooking process, but more specifically, utilizes a vessel that will at least sustain average cooking pressures within the vicinity of 55 to 60 p.s.i. Although, it is within the scope of this invention that cooking pressures up to six atmospheres, like 90 p.s.i., or even higher, could be used in performing this process. Various conduits connect with the vessel to provide means through which conveyance of heat and pressure is made into its interior as during a normal cooking operation, with an additional conduit providing for the conduction of a cooling medium into the upper regions of the vessel so that a rapid cooling of the product may be effected after it has attained its cooked stage. During a cooking operation wherein a large quantity of food is being prepared through the use of a temperature and pressure combined operation, it has been found that the degrees of temperature variance between the upper and lower regions of the vessel will differ by as much as 20° to 30° F. Such variance does not provide consistency in cooking of all the food product, and for this reason the apparatus of this invention incorporates means for circulating the heat within the vessel during the routine cooking process. A duct connecting with the upper and lower portions of the vessel provides for exhausting of the heat accumulating within the upward area of the vessel for transfer back into its bottom, and in this manner uniformity of temperature is maintained throughout the vessel. In another modification, a fan connected within the interior upward portion of the apparatus upon operation provides sufficient air turbulence to induce circulation of the heat energy to all portions of the vessel and therein stabilize its internal temperature.

Since most pressure cooking apparatuses require use of a vessel which is of substantial strength, and therefore of some weight, in order to withstand the elevated pressures required in their operation, the apparatus of this invention helps to remedy this problem by incorporating a lift means for use in mechanically opening or closing the heavy closure of the apparatus. This lift mechanism may be either mechanically, hydraulically, or pneumatically operated, and upon energizing will function to pivot the closure or cover in either direction as desired. The interior of the apparatus is constructed so as to compactly accommodate a large capacity of food for exposure to the cooking process, and a retainer for this purpose is constructed having a reinforced framework, that will withstand the abuse of repeated usage, including a series of parallel arranged food supporting plates or pans for holding a large quantity of the meat, poultry, fish, or other food. Since, as previously described, the temperatures within a larger sized pressure vessel may vary substantially, these food supporting plates are provided with a series of passages, such as a plurality of apertures therethrough, so that the pressure and in particular the heat energy may freely traverse to all portions of the interior of the apparatus.

In operation, this cooking apparatus is constructed to accommodate almost any method for pressure cooking of food products under any combinations of heat energy and pressure. And, in order to avoid any distortions in the uniform cooking of a batch of food products that may be disposed at opposite ends of the pressure vessel, a heat circulating means, including duct and exhaust device, provides for circulation of the internal heat for sustaining uniformity of temperature. Furhermore, to reduce the cooking time to a minimum and thereby minimize the loss of the natural juices of the product as through overcooking or prolonged exposure to heat, the product upon reaching a cooking temperature at its interior is immediately exposed to a coolant to provide for a rapid reduction in temperature. In this manner, as soon as the product is cooked it is relieved of any needless further exposure to the heat energy.

The preferred process for cooking of food product within this cooking apparatus, as a result of testing, has been found to comprise the steps of first exposing the product to heat until the temperature within the vessel reaches a predetermined cooking level, at which time gaseous pressure, such as pressurized air, is introduced into the vessel at that quantity, p.s.i., that has been previously discovered to provide for a rapid transfer of the heat deeply into the interior of the product, thereby accelerating the cooking process. During this function, and throughout the cooking process, the heat circulating means remains operative to maintain uniform temperature. Subsequently, as the product internally reaches a temperature at which it is considered thoroughly cooked, a coolant is discharged into the apparatus and provides for an immediate and rapid cooling of the temperature within the vessel, an especially of the surface of the product. During the cooling step, a drainage is partially opened just enough to allow for discharge of any accumulating coolant, and concurrently, since a decrease in temperature is coincident with some drop in pressure, the pressure line is opened sufficiently to provide entrance of ample air pressure to maintain the pressure reached during the cooking stage. When the temperature in the vessel has cooled, the drainage may be fully opened to allow for discharge of all pressure, any remaining heat, and the coolant. Thereafter, the appature may be opened and the cooked product removed. Through testing, it has been analyzed that when a food product is cooked under a procedure as just set forth, the time for cooking such food is reduced approximately 50% to 75% in comparison to the times required to cook like product through usage of the conventional cooking processes presently commercially used. In addition, since the product is so rapidly cooked, energy consumption is reduced approximately in half.

As illustrative and corroborative of the foregoing statistics, reference is made to FIG. 7 of the drawings wherein a graphic illustration is furnished which gives a comparison of the time and product yields acquired under conventional poultry cooking processes, and through use of this invention. Points $a$ and $b$ upon this graph indicate that the time and percent of cooking yields, respectively, of poultry wings and breasts, and poultry drumsticks and thighs, were cooked within 11 to 14 minutes and provided an approximate total average yield of 92%. Thus, cooking shrinkage of the poultry was reduced to approximately 8% of the precooked product through use of the cooking apparatus of this invention. Point $c$ upon the graph reveals that poultry parts cooked within the conventional steam cabinet, similar to those presently having wide-spread usage in the poultry processing industry, consumed approximately 45 minutes cooking time and yielded a finished product weighing only 80% of its initial precooked raw weight. Point $d$ on the graph shows that poultry parts cooked within a conventional open jacketed cooker and under water took approximately 60 to 90 minutes to prepare and yielded a cooked finished product which weighed only 74% of its fresh weight. Point $e$ upon the graph reveals that poultry parts cooked in a normal pressure cooker, under water, and under superimposed air pressures of up to 15 p.s.i., after cooking for 60 to 90 minutes, yielded a finished weight of only 76%. Point $f$ on the chart shows that tests run upon a cooking process utilizing a pressure vessel where pressure was first put into the vessel to surround the raw poultry product, and then heat energy was added to induce cooking, that a time of approximately 16 minutes was consumed and the aftercooked yield was around 88%. The results of these tests should indicate that poultry cooked with the apparatus of this invention substantially reduced the time required to achieve cooking and furnished higher cooking yields than has any other method heretofore utilized. This savings in the weight of the cooked product is quite significant in commercial food processing operations since retail pricings are based upon product weight. The food product as cooked through the usage of this invention was found to be pleasing in appearance, flavor, odor, and tenderness, having much of the natural juices retained interiorly, which naturally enhances the shelf life and avoids staleness of the product during the delays until consumption. In addition, rapidly cooling the product as in this process has eliminated the stewed appearance and texture of the poultry such as occurs during usage of most of the presently existing cooking methods.

BRIEF DESCRIPTION OF THE DRAWINGS

In the drawings, FIG. 1 is a perspective view of the cooking apparatus, showing the various conduits that convey the required elements to the pressure vessel during the cooking operation, in addition to the heat circulating and stabilizing means;

FIG. 3 is a perspective view of the retainer, including one of its food supporting plates, that is normally disposed within the pressure vessel of the cooking apparatus during the cooking process;

FIG. 6 is a fragmentary side view of a modification in the closure of the apparatus, showing a circulating fan for use in maintaining uniformity in the heat temperature throughout the cooking apparatus;

FIG. 7 provides a graphic illustration of the yields acquired and time expended in performing cooking operations through the use of the process of this invention, in addition to those methods utilized in the prior art; and FIG. 8 provides a sectional view of the cooking apparatus taken similarly along line 2—2 of FIG. 1, but also showing various modifications in its internal components.

DESCRIPTION OF THE PREFERRED EMBODIMENT

Figure 2:
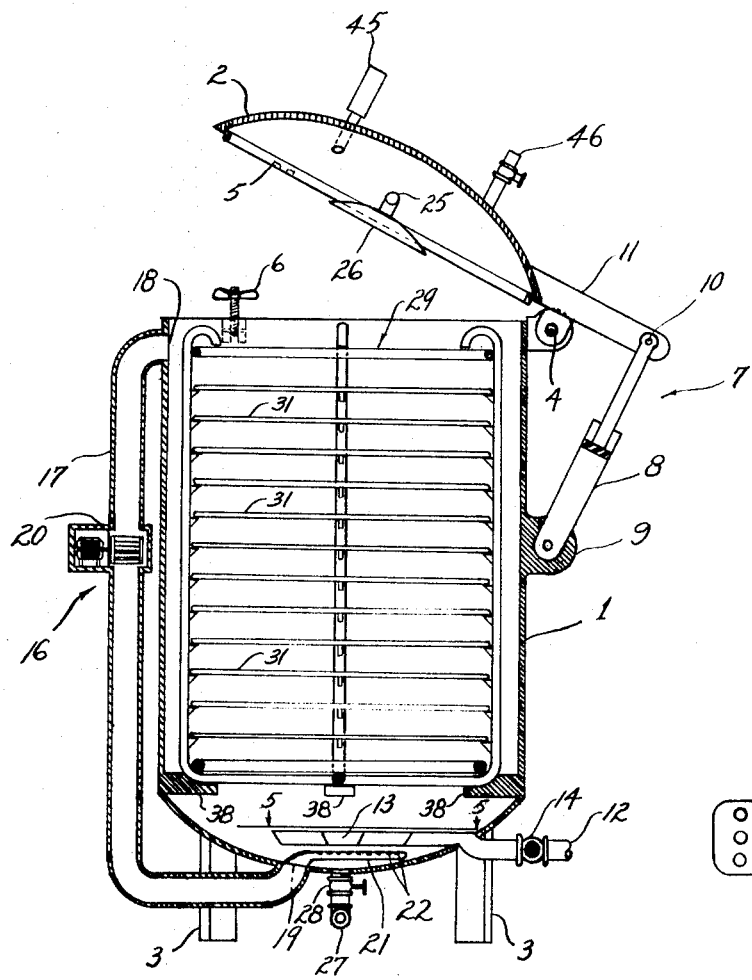
FIG. 2 is a sectional view of the cooking apparatus taken along the line 2—2 of FIG. 1, also showing the closure partially pivoted open through operation of the automatic lift.

Referring now to the drawings for an illustrative embodiment of the cooking apparatus of this invention, in FIG. 1, the cooking apparatus A is shown comprised of a pressure vessel 1 having a closure 2 mounted upon its upward portion so as to provide a thoroughly sealed enclosure for the apparatus during the pressure cooking process. The apparatus may be constructed to any capacity, size, or dimension necessary to provide the quantity of cooked foods desired, and the strength of the vessel should be sufficient to accommodate that degree of gaseous pressure needed to perform the cooking process, although a pressure vessel that may safely withstand pressures in the vicinity of 55 to 60 p.s.i. may be sufficient. For this reason, the apparatus is herein shown to be of circular design, since a vessel of any other configuration, such as rectangular shaped, requires excessive reinforcement to withstand such pressures. The apparatus is shown erected upon legs 3. By also referring to FIG. 2, it can be seen that the closure connects with the pressure vessel through the pivotal connection 4, and to retain the vessel in tight closure during the cooking process a series of lugs 5 and wing nuts 6 may be tightly interlocked. To facilitate opening and closing of the closure 2, there is provided a lift means 7, comprising a hydraulically or pneumatically operated cylinder 8 which pivotally connects at its lower end to the mount 9, while also pivotally connecting at its upper end 10 to the levers 11 formed integrally and projecting from the closure. Thus, the cylinder 8 may be retracted or extended when it is necessary to close or open, respectively, the closure of the apparatus.

Figure 5:
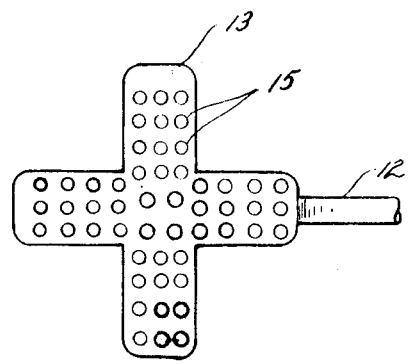
FIG. 5 is a top view of the heat emitting member taken along the line 5—5 of FIG. 2.

Heat energy is conducted to the cooking apparatus through the conduit 12 and released into the pressure vessel through the injecting member 13. Passage of the heat through the conduit and into the vessel may be controlled by the adjustable valve 14, and in this manner the fine regulation of the temperature within the apparatus during a cooking process may be carefully controlled. It should be noted that the heat injecting member 13 is conveniently located within the downward regions of the cooking apparatus, and in this manner the heat being discharged into the vessel will rise due to natural convection in a direction upwardly within the apparatus and therein perform the cooking process. Although, the heat energy may be inserted into the vessel through an interconnecting conduit attaching within other regions with the apparatus. The heat injecting member is herein shown as being cross-shaped in design, see FIG. 5, although other configurations may be utilized. The member 13 communicates in a heat transferring relationship with the conduit 12 for receiving the heat being conveyed therein, and the upward surface of the injecting member is formed with a plurality of apertures, as at 15, so as to provide for a uniform distribution of the heat energy into and throughout the lower regions of the apparatus, and eventually pervade throughout the entire apparatus. As previously stated, heat generated within any enclosed environment exhibits a tendency to rise through a natural convection, and for this reason, where the cooking apparatus of this invention is constructed to any substantial size, the heat injected therein during the cooking process will accumulate at higher temperatures within the upward regions of the vessel than it does in the lower portions. It has been found that a temperature variance by a much as 20° to 30° F. exists between the upward and lower cooking temperatures of the heat within the apparatus, and for this reason the heat circulating means 16 is provided for maintaining and stabilizing a uniform temperature through the entire interior of the cooking apparatus. The circulation system comprises an insulated duct 17 which attaches to and communicates with the interior of the vessel 1 in its upward regions, as noted at 18. This duct 17 also connects at its other end into a lower region of the pressure vessel, as at 19. To induce circulation of the heat, exhaust means, such as the squirrel cage fan and induction motor 20, is provided within the duct, and upon operation, furnishes an exhausting of the heat into and through the upper portion of the duct while simultaneously providing for its readmission into the lower regions of the pressure vessel through the lower segment of the duct. To provide for a uniform discharge of the circulating heat back into the apparatus, a distributor 21, having a series of apertures, as at 22, communicates with the duct 16 at the point of attachment 19, and extends transversely in the bottom portion of the vessel 1. In this manner the circulating heat may be discharged centrally back into the cooking apparatus, so as to provide a uniformity in the stabilization of heat temperature within the vessel, and avoid its rapid convection up the areas proximate the vessel's walls. Likewise, to prevent the attraction of the heat energy quickly up the sides only of the vessel, a conduit 21a similar to the distributor 21, may connect and communicate with the duct 17 at its point of connection 18 to the vessel and extend transversely across its interior to therein evenly exhaust the heat. Naturally, this latter conduit would have to be removed in order to allow for insertion or removal of food from within the cooking apparatus.

In addition to the conveyance of heat energy into the cooking apparatus, it is necessary, in order to perform the preferred cooking process, that gaseous pressure also be conducted into the vessel. Conduit 23 having an adjustable valve 24 interconnected therein, is provided for conveying pressure into the vessel at the desired p.s.i. required to satisfactorily perform the cooking process. In addition to the conveyance of heat and pressure to the vessel, it has been found useful, near the termination of the cooking process to discharge a cooling medium upon the cooked product so as to effect a rapid decline in its temperature. To perform such, a conduit 25 is connected through the closure 2, and attaches centrally of the same with a dispersion member 26 to provide for distribution of the coolant upon the food product located thereunder. This dispersion member may discharge a chilled water or other liquid or gas into the vessel and upon the cooked food, and thereby rapidly decrease the vessel temperature and the elevated product surface temperature immediately to a temperature below the suggested cooking temperature range, in addition to reducing the products' internal temperature. Although, this dispersion member is shown disposed only in the upward portion of the apparatus, other means may be employed for discharging the coolant into said apparatus. For example, a length of pipe 26a having a series of directional apertures provided along its length may be erected vertically along one side of the apparatus and therein direct a spray of coolant upon all levels of the product, as when it is desired to decrease the internal temperature. After completion of a cooking operation, and before the apparatus may be opened or removal of the food made, it is necessary that all of the elements of pressure and coolant, and heat if any remains, be discharged from the vessel. A drain 27 containing a valve 28 may be opened to achieve such.

Figure 4:
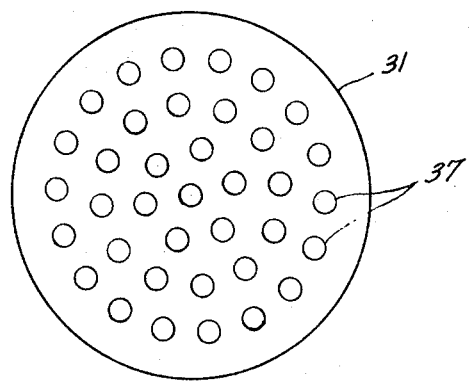
FIG. 4 is a top view of a food supporting plate, such as the plate shown in FIG. 3.

The food supporting retainer 29, also revealed in FIG. 3, comprises a structural reinforced framework 30 which supports a series of plates 31 upon which the food subjected to the cooking process rests. The framework 30 comprises a series of vertically disposed struts 32 which are integrally bent inwardly at their lower portions and interconnect, as at 33. The upward ends of the struts 32 are bent back, as at 34, so as to accommodate the hooks of a hoist (not shown) when it is desired to elevate or lower the retainer, respectively, from or into the cooking apparatus. Since the weight of the retainer when loaded to capacity with food during the cooking operation might be of substantial weight, the assistance of a hoist may be required. Lateral support is provided for the retainer by means of the annular braces 35. Secured to the inner edges of the struts 32 are a series of supports 36, and for each support connecting to a particular strut, there is a corresponding support connecting at the same horizontal level to each of the other struts. This relationship of the supports provides a level arrangement upon which a plate 31 may rest, and as many plates may be used with the retainer as there are groups of horizontally aligned supports to accommodate them. A food supporting plate 31 of the retainer is disclosed in FIG. 4, and is designed having a diameter which is slightly less than the distance between a diametrically opposite pair of struts, so that each plate may be easily inserted or removed from the retainer, such as for unloading of cooked product, or for cleaning purposes. And, in this regard, the plates preferably are constructed of stainless steel-like metal, since cleanliness is a major factor in the processing of foods. Each plate is provided with a series of passages, herein shown as the apertures 37, so that the heat energy within the cooking apparatus may easily permeate through the series of plates and readily communicate with the food exposed upon their upward surfaces to the cooking process. It should be noted in FIG. 2, that a series of parallel plates are provided, and the vertical distance between each plate should be sufficient so as to accommodate the size of the food product desired to be cooked. For example, where larger sized pieces of red meat are to be cooked in the apparatus, one or more plates may have to be removed so that the height of the meat will not be interfered with by the plate above, whereas, when poultry parts are cooked, probably all of the plates may be utilized in the retainer since the size of individual chicken parts is not too great. The size of the retainer is such that it may be easily accommodated within the interior of the cooking apparatus but yet extends into proximity with the interior walls of the pressure vessel, and when disposed within the apparatus may be conveniently rested upon the series of lugs 38. Although the retainer is herein disclosed comprising a series of plates supported by the framework, it is within the contemplation of this invention that where the food product to be cooked need not be delicately individually handled, the framework may be lined with side and bottom walls of a foraminous material, such as a gauge of wire as at 30a, and the food product may be disposed therein in bulk form. Also, to facilitate handling of the food laden retainer when removed from the apparatus, a set of casters 30b may attach to the underside of the framework 30 to provide for its easy transfer.

A modification to the invention is disclosed in FIG. 6, wherein the closure 39 includes a fan 40 to provide for circulation of the heat enclosed within the cooking apparatus. This means for circulating the heat and providing for its stabilization at a constant temperature throughout the cooking apparatus may be used in place of the circulating means 16 heretofore described, and it is designed to provide for sufficient turbulence upon its rotation to force the higher degrees of heat downwardly into the lower regions of the pressure vessel during the cooking process. This closure 39 also incorporates the usual lever 41 and dispersion member 42, and as described, has a motor 43, of the fan, providing for rotation of its blades 44, creating a wind velocity that is reflected by the upward surface of the dispersion member for causing circulation of the heat from this vicinity.

Since this cooking apparatus of the invention functions under the co-operation of the elements of heat, pressure, and coolant, it is necessary to provide various gauges to provide a quick indication as to the degrees of heat and pounds of pressure existing at any given moment within the vessel. A pressure gauge 45 mounts upon the closure 2, and its modification 39, and openly communicates with the interior of the cooking apparatus so as to provide an indication of the amount of pressure existing within the vessel. A pressure relief valve 46 also mounts upon the aforesad closures and provides for a discharge of any excessive pressure that may have built up within the apparatus during the cooking process. To provide an indication of the temperature existing within the cooking apparatus at any given moment, one or more thermometers, such as the thermometer 47, may be mounted upon the apparatus and communicate interiorly so as to be exposed to the heat. Although only one thermometer is shown, others may connect at both the upward and lower portions of the apparatus, and in addition, a thermometer having a thermocouple that may be inserted deeply into the interior of the particular food to be cooked may provide a ready indication of the degrees of heat that may be reached within the interior of the food exposed to the cooking process. Generally in cooking foods, especially meats, when instructions depict that a particular product will be thoroughly cooked when a certain temperature is acquired, this temperature relates to the internal temperature, and for this reason a probe that inserts into the product and provides an indication of its internal temperature at any particular moment is the best means for determining when the food is actually cooked.

In operation, the cooking apparatus of this invention functions through the co-operation and co-ordination of heat, pressure, and coolant, in addition to heat circulation, to provide a rapid process for thoroughly cooking foods, and with a minimum of food shrinkage or textural and nutritional loss. To achieve such, the retainer being removed from the open apparatus is loaded with food product to be cooked, the food being spread upon each of the plates 31 until the retainer has been thoroughly filled to capacity with the raw product. The retainer may then be hoisted and inserted within the pressure vessel 1 until it comes to rest upon the supporting lugs 38. At this time, the lift means 7 is energized to provide for a pivotal closing of the closure 2, and upon a tightening of the wing nuts 6, the vessel will be hermetically sealed for commencement of the cooking process. Heat energy, such as steam or superheated air, and gaseous pressure are then inserted within the pressure vessel by being conveyed, respectively, through the conduits 12 and 23. The amount of heat inserted into the vessel will naturally depend upon the product being cooked, but the thermometer will provide a ready indication of the temperature of the heat supplied therein. Likewise, the amount of pressure emitted into the vessel will depend upon the amount of pressure predetermined necessary for effecting the cooking process. As the temperature and pressure are being stabilized at the desired rates, the heat may be circulated within the apparatus by functioning of the circulating means 16. After a previously computed increment of time, an amount of time determined necessary for effecting the cooking process, or when the temperature of the product, surface or internal, reaches a certain level, coolant, such as chilled water, or other vaporous or gaseous cooling medium, may be discharged from the dispersion member onto and upon the cooked food product to provide for a rapid decline in its surface and internal temperatures. Simultaneously with the performance of the foregoing step, the drain 27 may be slowly opened to provide for a discharge of both the heat and pressure from within the vessel, and gradually of any coolant that may accumulate within the bottom of the same. As the heat and pressure give an indication of being almost totally exhausted from the vessel, further discharge of the coolant out of the dispersion member may be discontinued, and the drain valve 28 fully opened to provide for total expulsion of all heat, pressure and liquid from the cooking apparatus. Thereafter, the closure may be once again opened, and the retainer holding the cooked food be removed from the cooking apparatus.

The preferred process for cooking of the foods through usage of this cooking apparatus may be more accurately described through the following examples:

Example I

Pieces of raw poultry parts, comprising chicken wings, were placed upon the plates of the retainer and enclosed and sealed within the cooking apparatus. Heat, in the form of steam, was applied to the cooker until its internal temperature achieved approximately 200° F. In order to hold the pressure down during entrance of the heat, the drain remained slightly open, and therefore, the pressure in the vessel never greatly exceeded atmospheric pressure. The drain was then closed, further admittance of steam was curtailed, and pressurized air was injected into the cooking apparatus until its internal pressure achieved a level of approximately 45 p.s.i. Thereafter, steam was periodically admitted into the vessel to sustain a cooking environment and temperature level of approximately 215° F. to 225° F. This temperature and pressure was maintained in the cooking apparatus by periodically alternately emitting either air or steam into the vessel, and after approximately ten minutes of cooking time, further entrance of heat was totally discontinued, and a coolant in the form of cold water was discharged through the dispersion member into the upward regions of the vessel, while at the same time, additional pressurized air was also let in to maintain a constant pressure during this cooling cycle. This cooling operation continued for approximately 2.5 minutes, and during this time the drain was partially opened to allow the accumulating coolant to discharge, while preferably retaining the pressure. When the external or surface temperature of the poultry was reduced below 120° F., and its internal temperature was lessened preferably below 150° F., the drain was opened and both the air pressure and coolant were slowly discharged, and when it became apparent that pressure had been totally discharged, the coolant conduit was shut off and the remaining water allowed to drain from the apparatus. Thereafter, the cooking apparatus was opened, and the retainer and cooked poultry parts removed. It was found that the cooked poultry prepared by the process of this invention yielded 96% of its precooked weight, showing a reduction of around only 4% of weight during the cooking operation.

Example II

Raw poultry parts, comprising chicken breasts, were cleaned, soaked in a saline solution, and then weighed and placed upon the retainer for transfer into the cooking apparatus. The apparatus was properly sealed, and heat, in the form of superheated air, was admitted into the pressure vessel until the vessel's internal temperature achieved approximately 220° F. to 230° F. Immediately, pressure was injected into the vessel until a pressure of approximately 50 p.s.i. was reached. This poultry was cooked for approximately 12 minutes at temperatures and pressures stabilized at those as just set forth, whereupon coolant in the form of chilled water was discharged into the apparatus along with a slight amount of additional pressure. When the internal temperature of the poultry was reduced below 150° F., achieved through exposure of the cooked poultry to the coolant for approximately 3.75 minutes, the drain was fully opened and the remaining pressure and heat along with the draining coolant were allowed to gradually discharge. The cooked poultry breasts were thoroughly inspected, and weighed to reveal a yield of approximately 94% of their precooked weight. In addition, the cooked product had a pleasing light gold appearance, and upon their dissection revealed a juicy interior issuing a refreshing aroma.

Example III

Freshly cleaned and deveined shrimp was placed upon the retainer and inserted into and sealed within the pressure vessel of the cooking apparatus. Steam was injected into the vessel until its temperature reached a range between approximately 190° F. to 225° F. Air pressure was immediately introduced into the vessel until it reached a capacity of 30 p.s.i. over the previously admitted pressure of the heat, and eventually this pressure-temperature relationship elevated the temperature internally of the shrimp to around 170° F. The shrimp was cooked at this temperature and pressure for approximately four minutes, although it should perhaps be stated that a lesser time may be utilized in the event that smaller shrimp are being cooked, at which time a coolant was discharged upon the cooked product until its surface temperature was reduced below 120° F., and the internal temperature dropped at least lower than 150° F. During this time, the drain was slightly opened to allow for release of the coolant accumulating in the lower regions of the apparatus, but the pressure was retained. If necessary, additional pressure was introduced into the vessel to maintain the pressure around 30 p.s.i., even during the cooling cycle. As the cooler temperatures were achieved, the drain was opened, further release of coolant discontinued, and all of the accumulated pressure and remaining coolant was totally discharged. The cooked shrimp was then removed from the apparatus and weighed to reveal a yield of approximately 92% of its precooked weight, and exhibited a pinkish-white appearance in color and reduced curl as a result of retention of its natural juices, and because of the shortness of the cooking time.

Example IV

Portion controlled individual sized servings of red meat, comprising slices of beef, were cleaned and placed upon the food supporting plates for positioning within the cooking apparatus. After the pressure vessel was properly sealed, steam was introduced into the apparatus until the beef achieved an internal temperature of at least above 155° F., while the internal temperature of the vessel reached approximately 215° F. to 225° F. During the latter stages of the elevation of the temperature, air pressure was inserted into the vessel until it reached a pressure of approximately 55 p.s.i. The temperature was stabilized at approximately 220° F. and the pressure maintained at 55 p.s.i. for approximately twelve minutes, at which time a coolant was discharged into the vessel to provide for a rapid reduction of the heat. The drain was slightly opened to provide for removal of gathering coolant, but pressure was still maintained through additional air pressure at approximately 45 to 55 p.s.i. When the internal temperature of the beef was reduced below 150° F., the drain was opened and all pressure, whatever remaining heat, and coolant was discharged from the vessel, whereafter the retainer and cooked meat were taken from the apparatus. The portions of beef exhibited a texture that appeared thoroughly cooked, and the weighed finished product revealed a yield of approximately 83% of its precooked weight.

Cooking of meat, poultry, and fish under this preferred process is beneficial from the standpoint that it yields a finished product having greatly reduced shrinkage in both the protein content and moisture of the meat than cooking processes heretofore utilized have been able to achieve. The reason for this is probably due to the sequence utilized in the cooking process, namely, elevating the heat to approximately a cooking temperature, then immediately exerting pressure upon the heat and product so as to force an absorption of the heat deeply into the internal portions of the product. In this manner the cooking time is greatly accelerated, due to the product rapidly absorbing its cooking heat and only having to retain the same for a much shorter length of time than under conventional cooking methods. For this reason the product, to the benefit of its moisture, is never allowed to overcook, or shrink to dryness. Another factor of this cooking process, that has been found to enhance its final results, is that by rapidly chilling the cooked product, through the use of a cooling medium such as cold water, nitrogen, or the like, that after the product has acquired an internal temperature sufficient to induce cooking, as the external surface of the product is quickly chilled the internal temperature of the product yet continues to slightly elevate for a short increment of time before it also begins to descend. The benefit from this occurrence is that during the inception of the product's rapid chilling, the coolness effected upon the surface of the product while its internal temperature remains the same or slightly elevates, if only for a few seconds, further coagulates the surface protein and prevents the natural juices of the product from exuding out. Therefore, as the product is totally chilled, its natural juices are retained, producing a finished product that is almost as nutritional as the raw product.

Use of this invention in the particular form of apparatus as heretofore disclosed results which are more effective than have heretofore been achieved under conventional cooking or pressure cooking methods and apparatuses thus far utilized.

It should be understood that the above-described invention is simply illustrative, and other advantages may become apparent to those skilled in the art and changes in and modifications to the apparatus herein set forth without departing from the spirit and scope of this invention. Such modifications and variations are intended to be covered by any patent protection acquired upon this invention.

Having thus described this invention, what is claimed and desired to be secured by Letters Patent is:

1. An apparatus for cooking food wherein pressure is independently exerted upon the gaseous heat energy utilized in cooking the food to induce its rapid transfer into the interior of the food and thereby accelerate the cooking process while concurrently effecting a reduction in the dissipation of the integral food moisture, comprising: a pressure vessel capable of receiving and retaining the exposed food to be cooked, closure means provided upon the vessel and hermetically sealing the vessel during the cooking process and upon opening providing an entrance for inserting and withdrawing food from the vessel, means conveying heat into the vessel for elevating its internal temperature and commencing and effecting the food cooking process, means connecting with the vessel for transferring gaseous pressure into the vessel subsequent to the introduction of the heat, means when operative inducing circulation of the gaseous heat energy from the upward into the lower regions of the pressure vessel during the cooking process for maintaining uniformity of temperature throughout said vessel, means for retaining the food exclusively within the heat and pressure environment during the cooking process, and means for releasing the heat and pressure from the vessel after completion of the cooking operation.

2. The invention of claim 1 wherein the means circulating the heat comprises a duct opening into the upper and lower regions of the vessel, heat transferring means connecting with the duct and when operative providing for circulation of the heat through the duct and vessel thereby maintaining uniformity of temperature throughout said vessel.

3. The invention of claim 2 and including a conduit connecting with each end of the duct at the location of its attachment to the vessel, each conduit projecting interiorly of the vessel to provide for uniform exhausting of the heat in the vessel through the one conduit and even distribution of the heat into the vessel through the other conduit.

4. The invention of claim 1 wherein the means circulating the heat comprises a fan connecting to the vessel upwardly of the location where the food is deposited in the vessel, said fan when operative circulating the gaseous heat from the upper to the lower regions of the vessel.

5. The invention of claim 1 wherein said closure means pivotally connects with the pressure vessel at adjacent edges thereof, lift means interconnecting between said closure means and vessel and upon functioning providing for the pivotal opening or closing of the closure means.

6. The invention of claim 1 and including means for dispersing a cooling medium upon the food to effect its rapid cooling, said means connecting with said apparatus and being directionally oriented to provide for effective discharge of the cooling medium into the vessel and upon the disposed food for effecting a decrease in temperature.

7. The invention of claim 6 wherein the dispersing means is positioned in the upward region of the vessel at a location substantially above any food properly disposed therein as exposed to the cooking process.

8. The invention of claim 1 wherein the food retaining means is of a size that provides for its compact disposition within and with respect to the interior of the vessel, said retainer when positioned within the vessel being located in heat exposing relationship to the means discharging heat into the vessel so as to dispose all the food uniformly to the cooking process, and said retainer capable of being removed from the vessel.

9. The invention of claim 8 wherein said retainer comprises a structural framework having a series of vertically disposed struts, a plurality of support means connecting with each strut, each support means having corresponding support means connecting at the same horizontal level to each of the other struts, a series of food supporting plates, each plate being supported by the corresponding horizontally aligned support means of each strut, each plate having passages for allowing freedom of movement and circulation of the heat energy therethrough.

10. The invention of claim 8 wherein said retainer comprises a basket-like structure formed with a structural framework having foraminous side and bottom walls for holding the food without substantially interfering with the passage of the heat energy therethrough.

References Cited

UNITED STATES PATENTS

| | | | |
|---|---|---|---|
| 1,485,133 | 2/1924 | White | 99—330X |
| 1,636,768 | 7/1927 | Ford | 99—330X |
| 2,088,990 | 8/1937 | Barrett | 126—378 |
| 2,472,970 | 6/1949 | Hanna | 126—369X |
| 2,507,891 | 5/1950 | David | 23—290.5X |
| 2,652,768 | 9/1953 | Moreno | 99—417 |
| 2,654,583 | 10/1953 | Treanor | 165—108UX |
| 2,827,379 | 3/1958 | Phelan | 99—330X |
| 2,948,620 | 8/1960 | Ashley | 99—251X |
| 3,195,761 | 7/1965 | Coats | 49—280X |

FOREIGN PATENTS

| | | | |
|---|---|---|---|
| 139,776 | 12/1950 | Australia | 99—330 |

BILLY J. WILHITE, Primary Examiner

U.S. Cl. X.R.

99—107, 330, 343, 355, 417; 126—369; 165—108